United States Patent
Poudrier et al.

(10) Patent No.: US 7,640,096 B1
(45) Date of Patent: Dec. 29, 2009

(54) SYSTEM AND METHOD FOR AUTOMATICALLY TURNING OFF A VEHICLE

(75) Inventors: Guillaume Poudrier, St-Pierre-les-Becquets (CA); Pascal Poudrier, Victoriaville (CA)

(73) Assignee: Led Enterprises GPP Inc., Trois-Rivières, Québec (CA)

( * ) Notice: Subject to any disclaimer, the term of this patent is extended or adjusted under 35 U.S.C. 154(b) by 9 days.

(21) Appl. No.: 12/137,881

(22) Filed: Jun. 12, 2008

(51) Int. Cl.
*G06F 19/00* (2006.01)
*F02D 29/02* (2006.01)

(52) U.S. Cl. ...................................... 701/112
(58) Field of Classification Search .............. 701/112, 701/113, 115; 123/179.4, 179.5, 179.15
See application file for complete search history.

(56) References Cited

U.S. PATENT DOCUMENTS 5,610,814 A    3/1997  Sugioka et al.
5,913,802 A  * 6/1999  Mullet et al. .................. 56/10.8
2008/0010001 A1 * 1/2008  Lecole et al. ................ 701/112

FOREIGN PATENT DOCUMENTS

JP    2009-2312 A  *  8/2009

* cited by examiner

*Primary Examiner*—Hieu T Vo
(74) *Attorney, Agent, or Firm*—Bereskin & Parr

(57) ABSTRACT

The present invention relates to a system and method for turning off a vehicle when in an idle state. The system comprises a stationary state detector for detecting a stationary state of the vehicle and a timer for measuring a period during which a stationary state is detected. In addition to this, the system further comprises a presence sensor for sensing the presence of a driver in the vehicle and an engine cutoff for turning off the fuel engine. Moreover, the system comprises a controller for processing an input from the stationary state detector, an input from the timer and an input from the presence sensor. The controller is adapted to activate the engine cutoff when the stationary state is detected for a period of time that is greater than a period threshold and when the presence sensor senses that the driver is present.

15 Claims, 6 Drawing Sheets

SYSTEM AND METHOD FOR AUTOMATICALLY TURNING OFF A VEHICLE

FIELD OF THE INVENTION

The invention relates to a system and method for automatically turning off a vehicle.

BACKGROUND OF THE INVENTION

Over the last couple of years it has been recognized that fossil fuel prices have been increasing. Not only have the prices increased, record breaking prices have been flagged and there are no signs of the prices to significantly reduce. As a result, transportation companies or companies that have fleet vehicles running on fossil fuel have been experiencing a dramatic increase in their spending for fuel. In consequence, these companies are trying to find ways of reducing their fuel consumption for making transportation more viable.

There are not only financial incentives for reducing fuel consumption but also environmental incentives. Transport companies with an environmental conscience are also willing to find ways for reducing carbon dioxide gas emissions produced by the burning of fossil fuel.

A recognized way of reducing fuel consumption is to turn off an engine when the vehicle is running on idle. However, manually turning off the engine requires a driver of the vehicle to be disciplined. Turning off the engine may seem cumbersome to a driver and the trouble of turning off the engine every time it is running on idle may seem as a futile effort to the driver. This is furthermore the case when the driver is employed by a company and is not required himself to pay for the fuel.

The companies absorbing fuel cost would however see a benefit if the drivers would cooperate in turning their vehicle engines off when running on idle.

In U.S. Pat. No. 5,610,814, Sugioka et al. describe a control apparatus for automatically turning off an electric vehicle such as an electric motor bicycle. Several embodiments of the control apparatus are presented, all having in common the detection of the absence of a driver. More particularly, one embodiment presents a way off automatically turning off the electric motor when the absence of a driver is sensed for a certain period of time. Several sensors may be used for sensing the absence of the driver, according to an embodiment, a sensor is placed in a driver seat of the vehicle. According to another embodiment, a sensor is placed on a floor of the vehicle for sensing the absence of the driver.

In the case of fleet vehicles, the driver may still be present in the vehicle and yet the vehicle may be running on idle. Therefore a way to automatically turning off an engine of an idle vehicle when the driver is present would be beneficial, so as to reduce fuel consumption and environmental detriments while running on idle.

SUMMARY OF THE INVENTION

The present invention relates to a system and method for automatically turning off a vehicle. More particularly, the present invention relates to a system and method for automatically turning off a vehicle on idle when a driver is present in the vehicle.

According to an embodiment of the present invention, the system comprises a controller module that is adapted to activate an engine cutoff module. The controller module is adapted to activate the engine cutoff module only under given circumstances. The controller module is therefore adapted to identify at least one predetermined given circumstance under which the engine should be cutoff. For doing so, the controller module is in communication with a set of sensors and detectors.

In more detail, the controller module is in communication with at least one presence sensor and at least one stationary state detector. The presence sensor is adapted to sense if the driver is present in the vehicle. On the other hand, the stationary state detector is adapted to detect if the vehicle is in movement or if the vehicle is stationary. Based on the input from the presence sensor and the stationary state detector, the controller module is adapted to decide if the engine should be turned off or not.

According to an embodiment, the predetermined given circumstance under which the controller module would decide to turn off the engine is when a presence is sensed in the vehicle and when the vehicle is stationary for a certain period of time. The present invention proposes several ways of sensing the presence of the driver in the vehicle such as, sensing a weight on a seat, sensing a fastened seat belt, sensing an activated brake or sensing an activated hand brake, etc. Moreover, the present invention also proposes several ways of detecting a stationary state, such as, reading a speed of the vehicle and for which the speed of the vehicle is below a given threshold.

According to another embodiment, the present invention also describes a method for automatically turning off a vehicle. The method comprises detecting a stationary state, sensing a presence of a driver and activating an engine cutoff for turning off an engine of the vehicle. Furthermore, detecting a stationary state comprises monitoring a vehicle speed, measuring a period and identifying a period. According to an embodiment, a stationary state is detected when the speed of the vehicle is below a predetermined speed threshold for a period of time that is above a predetermined period threshold.

BRIEF DESCRIPTION OF THE DRAWINGS

For a better understanding of embodiments of the system and method described herein, and to show more clearly how they may be carried into effect, reference will be made by way of example, to the accompanying drawings in which.

DETAILED DESCRIPTION OF THE INVENTION

The present invention relates to a system and method for automatically turning off a vehicle. More particularly, the present invention relates to a system and method for automatically turning off an idle vehicle when a driver is present in the vehicle. The present invention is applicable to any type of vehicle that uses a source of energy to function such as fuel engine vehicles, electrical vehicles, etc. Moreover, the present invention is applicable to passenger vehicles, merchandise transport vehicles, agriculture equipment vehicles, recreational vehicles, etc.

The aim of the present invention is to provide a way to automatically turn off the engine of the vehicle when the vehicle is running on idle for a certain time, even when a driver is present. The idea behind this is to reduce fuel consumption of vehicles for which drivers do not have the discipline to manually turn off the engine of the vehicle when it's running on idle for a certain time.

Figure 1:
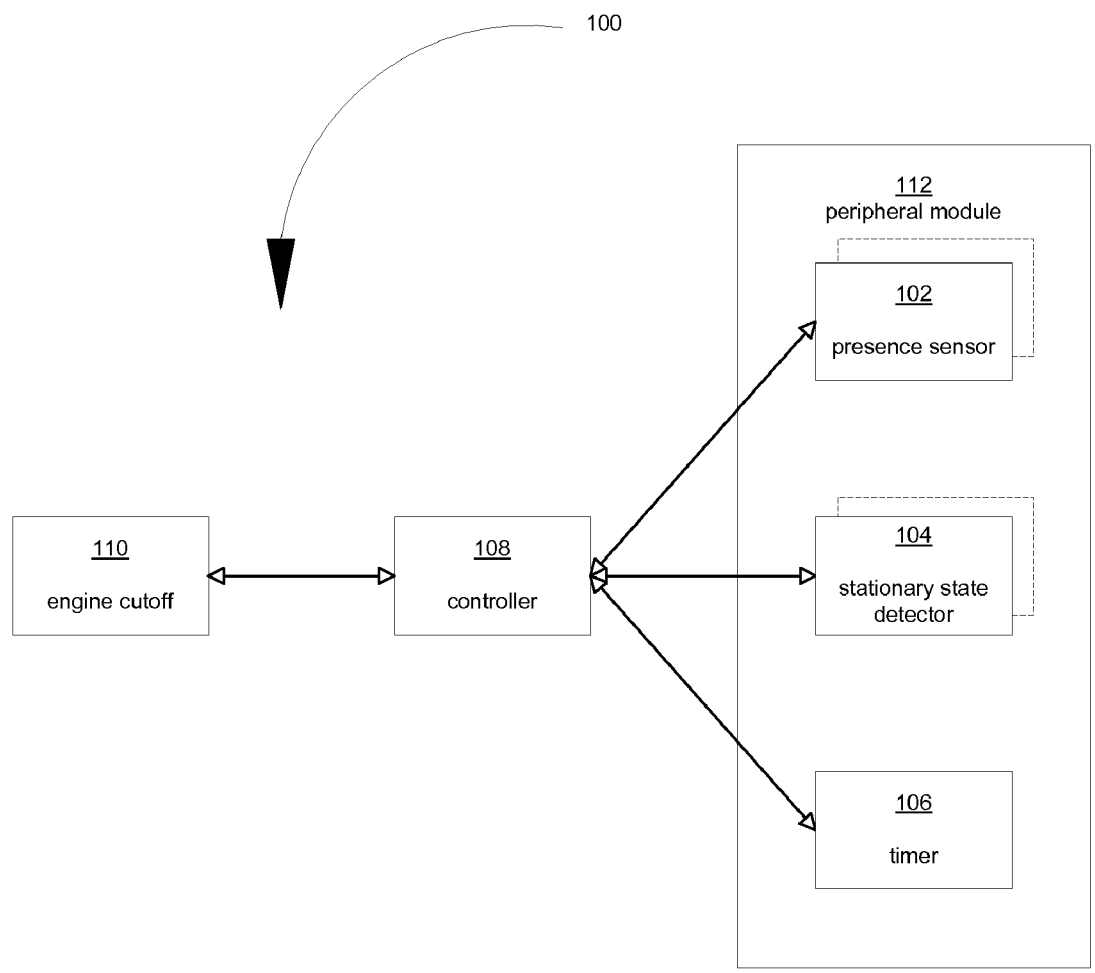
FIG. 1 depicts a block diagram of a system according to an embodiment of the present invention.

Presented in FIG. 1 is a generalized view of the system 100 comprising a presence sensor 102, a stationary state detector 104 and a timer 106 that all are adapted to communicate readings to a controller 108. Based on the readings, the controller 108 in turn is adapted to activate an engine cutoff 110. The activation of the engine cutoff 110 results in turning off an engine of the vehicle.

However, before the controller 108 proceeds to the activation of the engine cutoff 110, certain conditions must be reached. One of the conditions requires that the presence sensor 102 senses the presence of the driver. Another condition requires that the stationary state detector 104 detects that the vehicle is stationary. In addition to this, another condition requires that the timer 106 measures a stationary state period that is greater than a predetermined threshold period.

A skilled reader will understand that the predetermined threshold period is variable. A user may set the threshold period to a desired period. Moreover, depending on the type of presence sensor 102 through which a presence is sensed, the predetermined threshold period is variable.

According to an embodiment of the present invention, the modules are connected to each other through a wired link and communicate with each other according to a communication protocol. There are however other possible ways of providing communication between the modules. In an alternate embodiment, the modules are connectable through a wireless link.

According to an embodiment, a bidirectional communication is established between the controller 108 and at least one peripheral module 112 (presence sensor 102, the stationary state detector 104 and the timer 106). As a result, the bidirectional communication allows the controller 108 to request a reading from at least one peripheral module 112. Moreover, the bidirectional communication allows at least one peripheral module 112 to send the requested reading to the controller 108.

According to another embodiment, a unidirectional communication is established between the controller 108 and at least one peripheral module 112. In this case, once a communication has been established between the controller 108 and one of the a least one the peripheral module 112, the peripheral module 112 periodically sends a reading to the controller 108.

It is also possible for the controller 108 and the peripheral modules 112 to be adapted for handling a combination of unidirectional communication and bidirectional communication.

Further presented in FIG. 1, according to an embodiment of the present invention, a unidirectional communication is established between the engine cutoff 110 and the controller 108. The controller 108 is adapted to send an activation instruction to the engine cutoff 110 once the controller 108 establishes that the conditions for the turning off the engine of the vehicle are met.

Alternatively, the controller 108 and the engine cutoff 110 are adapted to handle a bidirectional communication. In this case, in addition to provide the communication means for the controller 108 to send an instruction to the engine cutoff 110, the engine cutoff 110 is given the communication means to send an acknowledgement to the controller 108.

Figure 2:
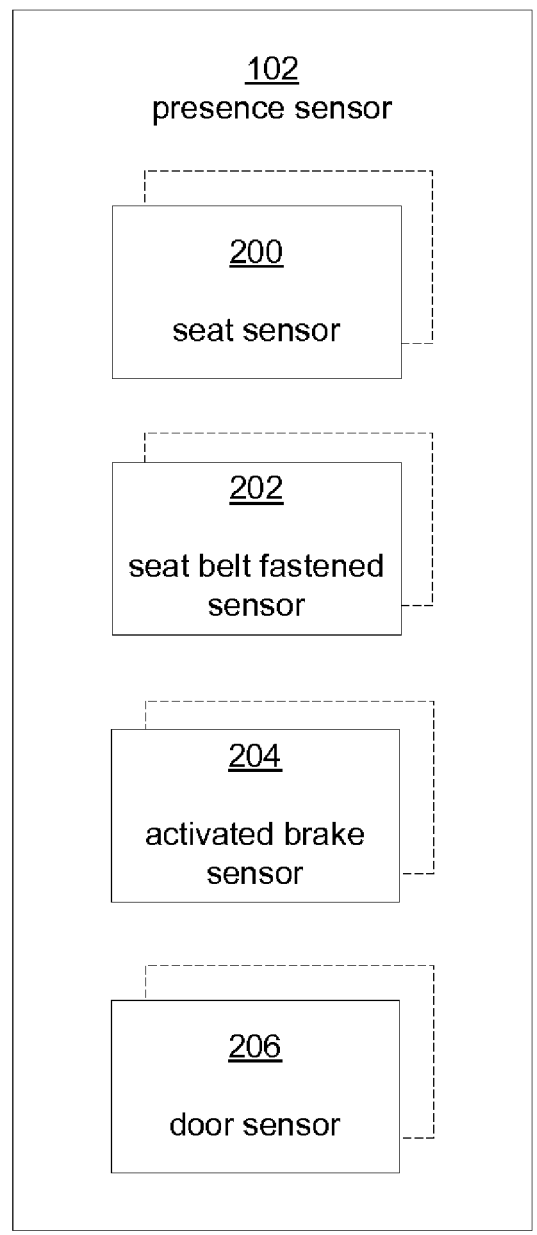
FIG. 2 depicts a block diagram of a presence sensor of the system according to an embodiment of the present invention.

Presented in FIG. 2 is a presence sensor 102 comprising at least one type of sensor for sensing the presence of the driver. According to an embodiment of the present invention, the presence sensor 102 comprises a seat sensor 200. The seat sensor 200 is adapted to sense a weight on a driver's seat or a certain pressure on the driver's seat. As a result, when the driver is present, the seat sensor 200 senses that the driver is present through the measured weight or the pressure exerted on the seat by the seated driver.

According to an embodiment, a minimum weight threshold is predetermined to disregard a measured weight on the driver's seat that is lower than a possible driver's weight. In this case, lighter objects left on the driver's seat such as boxes or animals would not trigger the seat sensor 200.

In another embodiment, the presence sensor 102 comprises a seat belt fastened sensor 202. The seat belt fastened sensor 202 is adapted to sense the presence of the driver through a fastened seat belt. The seat belt fastened sensor 202 is located in the seat belt buckling system.

In yet another embodiment, the presence sensor 102 comprises an activated brake sensor 204. The activated brake sensor 204 senses the presence of the driver as the brake pedal is activated by the driver. The brake sensor 204 is located in the braking system of the vehicle.

In an alternate embodiment, the presence sensor 102 comprises a door sensor 206. The door sensor 206 is adapted to sense if a door has been opened or not. Under certain conditions, once a door sensor 206 senses that the driver's door has been opened, the controller 108 is adapted to recognize that the driver has left the vehicle. However, again under certain conditions, if the door sensor 206 has not sensed that the driver's door has been opened, the controller 108 is adapted to assume that the driver is still present in the vehicle. The door sensor 206 is located in the driver's doorframe.

Various types of presence sensors 102 have been described, it will be apparent to the versed reader that there are other types of presence sensors 102 that would also be appropriate for sensing the presence of the driver, such as heat sensors, steering wheel pressure sensors, floor pressure sensors, etc. All these sensors are usable either alone, in multiple sets or in combination with other types of sensors.

In the case contradictory readings are taken by a plurality of sensor types, the presence sensor 102 or the controller 108 is adapted to apply a prioritization rule for prioritizing a predetermined sensor type. According to an embodiment, the prioritization rule consists of associating a set of points to a given sensor type depending on its estimated level of accuracy.

For example, if it is considered that the seat sensor 200 is the most accurate sensor, ten points will be associated to the readings of this type of sensor, however only five points will be associated to the readings of the door sensor 206. In this case if there is a contradictory reading between an equal number of seat sensors 200 and door sensors 206, it is the readings of the seat sensors 200 that will be considered. On the other hand, if there is more than double of door sensors 206 in comparison with seat sensors 200, and all door sensors 206 have the same reading, it is the readings of the door sensors 206 that will be considered.

In an alternative embodiment, the presence sensor 102 or the controller 108 is adapted to apply a majority rule for considering readings returned by the majority of the sensors. For example, if there are three sensors that have a same reading and two sensors that have a same contradicting reading, it is the readings of the three sensors that have the same reading that will be considered.

Similarly, in the case contradictory readings are taken by a plurality of presence sensors 102, the controller 108 is adapted to apply a prioritization rule for prioritizing the presence sensor 102. Alternatively, the controller 108 is also adapted to apply a majority rule for considering the readings returned by the majority of the presence sensors 102.

Figure 3:
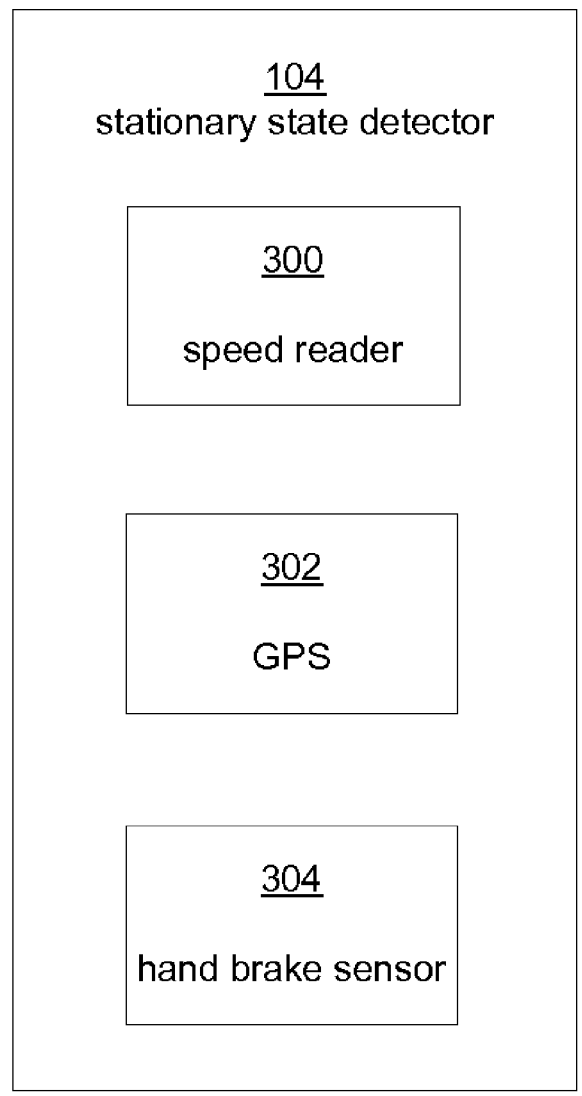
FIG. 3 depicts a block diagram of a stationary state detector of the system according to an embodiment of the present invention.

Now turning to FIG. 3, it is shown that the stationary state detector 104 comprises at least one type of stationary state detector 104 for detecting a stationary state of the vehicle. The stationary state detector is adapted to make readings of indicators that are useful for determining if a vehicle is in the stationary state or not. The controller 108 will consider the vehicle to be in the stationary state when a reading taken from the stationary state detector 104 characterizes the stationary state of the vehicle.

According to an embodiment, the controller 108 considers the vehicle to be in the stationary state when the speed of the vehicle is below a predetermined speed threshold. For doing this, the stationary state detector 104 comprises a speed reader 300 which is adapted to continuously or iteratively read the speed of the vehicle.

According to another embodiment, the controller 108 considers the vehicle to be in the stationary state when a positioning system indicates, during a given period of time, a variation in the position that is below a predetermined threshold. For doing this, the stationary state detector 104 comprises a GPS (Global Positioning System) 302 receiver that is adapted to iteratively compute the position of the vehicle.

According to yet another embodiment, the controller 108 considers the vehicle to be in the stationary state when a hand brake is activated. For doing this, the stationary state detector 104 comprises a hand brake sensor 304 adapted to indicate when the hand brake is activated. The hand brake sensor 304 is located in a hand braking system.

In addition to this, the stationary state detector 104 comprises also other types of detectors that are used alone or in combination with other types of detectors such as a wheel movement detector, a neutral gear detector, a park position detector, etc. All these detectors are usable either alone, in multiple sets or in combination with other types of detectors.

For example, according to an embodiment of the present invention, the controller 108 considers the vehicle to be in the stationary state when the stationary state detector 104 identifies the stationary state in conjunction with a deactivated brake pedal. In this case, even though the vehicle is essentially in the stationary state, if the brake pedal is activated the controller 108 disregards the stationary state. This prevents among others the vehicle from being turned off when the vehicle is temporarily stopped at a red light or so.

In the case contradictory readings are taken by a plurality of detector types, the stationary state detector 104 or the controller 108 is adapted to apply a prioritization rule for prioritizing a detector type. According to an embodiment, the prioritization rule consists of associating a set of points to a given detector type depending on its estimated level of accuracy.

For example, if it is considered that the speed reader 300 is the most accurate detector, ten points will be associated to the readings of this type of detector, however only five points will be associated to the readings of the hand brake sensor 304. In this case if there is a contradictory reading between an equal number of speed readers 300 and hand brake sensors 304, it is the readings of the speed readers 300 that will be considered. On the other hand, if there is more than double of hand brake sensors 304 in comparison with speed readers 300, and all hand brake sensors 304 have the same reading, it is the readings of the speed readers 300 that will be considered.

In an alternate embodiment, the stationary state detector 104 or the controller 108 is adapted to apply a majority rule for considering readings returned by the majority of the detector types. For example, if there are three detector types that have the same reading and two detector types that have the same contradicting reading, it is the readings of the three sensor types that will be considered.

In a similar way, in the case of contradictory readings that are taken by a plurality of stationary state detectors 104, the controller 108 is adapted to apply the prioritization rule for prioritizing the stationary state detector 104. Alternatively, the controller 108 is also adapted to apply the majority rule for considering the readings returned by the majority of the stationary state detectors 104.

Figure 4:
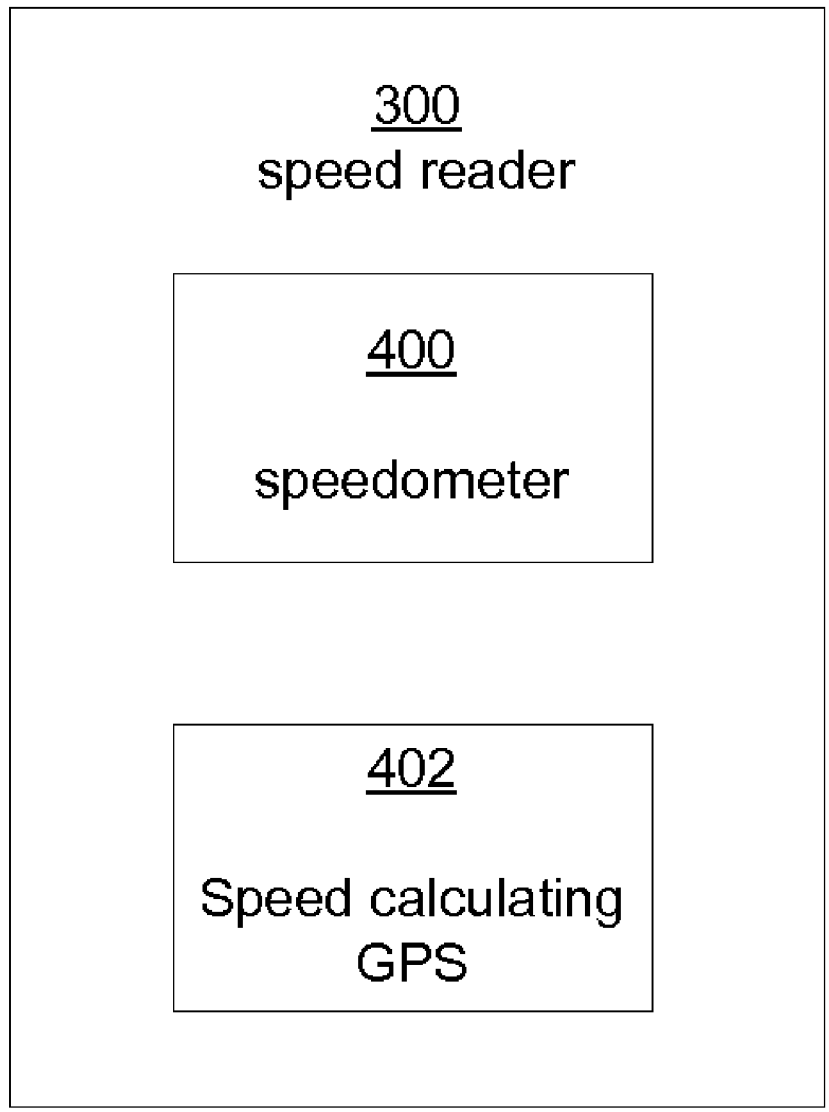
FIG. 4 depicts a block diagram of a speed reader of the system according to an embodiment of the present invention.

Returning to the speed reader 300 that is adapted to read the speed of the vehicle, the stationary state detector 104 comprises various forms of speed readers 300. Just to name a few, presented in FIG. 4 are some types of speed readers 300 that are used by the system 100. The speed reader 300 comprises a speedometer 400, which is conventionally available in a vehicle. Alternatively, the speed reader 300 comprises a speed calculating GPS 402 receiver.

This system 100 is adapted to be installed in the vehicle during its manufacture. It is as well adapted to be retrofitted in the vehicle as an addition by any person having the ability to install the system 100. For instance, the system 100 is adapted to be installed in the vehicle by a service provider, by a vehicle owner, by a mechanic, etc.

Figure 5:
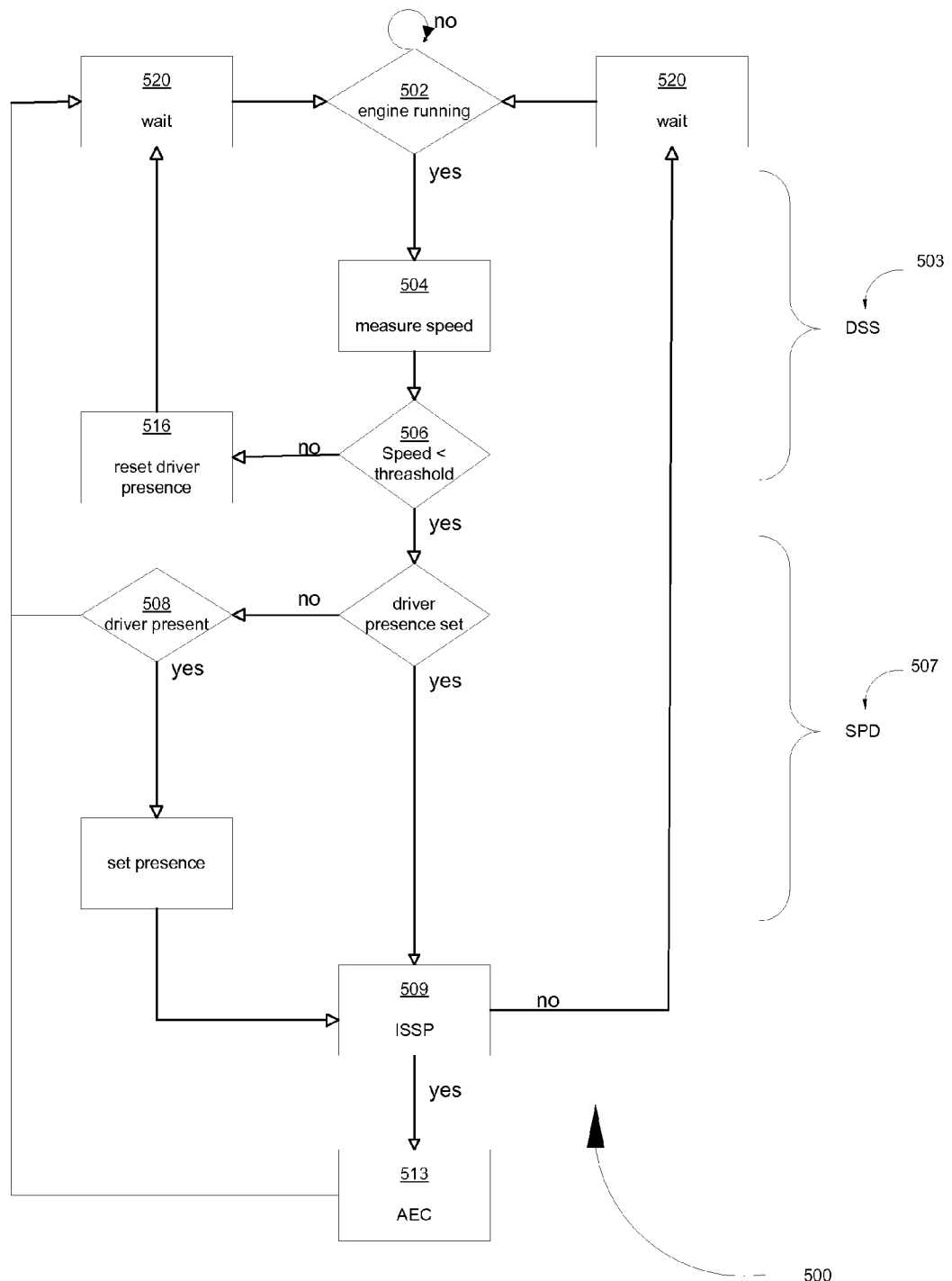
FIG. 5 depicts a workflow diagram of a method according to an embodiment of the present invention.
Figure 6:
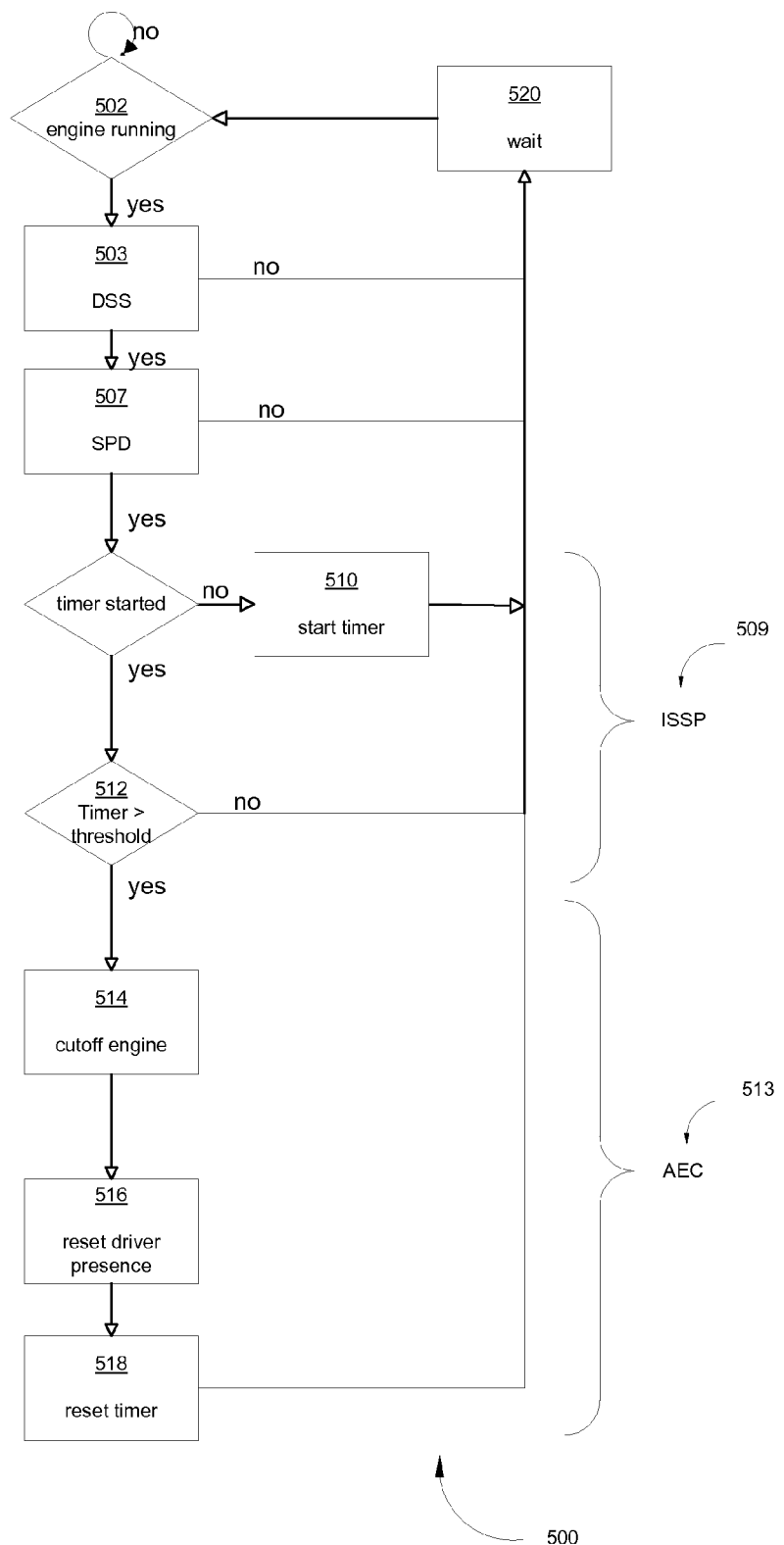
FIG. 6 depicts a workflow diagram of a method according to an embodiment of the present invention.

Presented in FIG. 5 and FIG. 6 is a workflow flowchart that describes a method 500 for turning off the engine of the vehicle. It is however according to certain conditions that the method 500 provides for turning off the engine of the vehicle. To verify if the conditions are met, the method comprises several verification steps that are further processed by the controller 108, such as concurrently presented in FIG. 1. The method 500 comprises steps for detecting the stationary state (DSS) 503 of the vehicle through the use of the stationary state detector 104. Moreover the method 500 comprises steps for sensing the presence of the driver (SPD) 507 through the use of the presence sensor 102. In addition to this, the method 500 further comprises steps for identifying the stationary state period (ISSP) 509 thanks to the timer 106. Furthermore, the method 500 comprises steps for activating the engine cutoff (AEC) 513.

Presented in FIG. 5 and concurrently presented in FIG. 1, according to an embodiment, detecting the stationary state (DSS) 503 of the vehicle is done by the stationary state detector 104. The stationary state detector 104 is adapted to monitor the speed of a running vehicle, this is done through a monitoring speed step 504. The speed of the vehicle is then indicated as being greater or lower than the speed threshold through an indicating speed step 506. The indicating speed step 506 compares the speed with the speed threshold and indicates if the actual speed of the vehicle is greater or lower than the predetermined speed threshold. Accordingly, the stationary state is detected if the indicating speed step 506 indicates that the actual speed of the vehicle is lower than the predetermined speed threshold. The speed threshold is either a halt or at least close enough to a halt.

Further presented in FIG. 5, according to another embodiment, once it has been established that the stationary state is detected, sensing the presence of the driver (SPD) 507 is done by the presence sensor 102 such as concurrently presented in FIG. 1. The presence sensor 102 senses the presence of the driver through a checking driver presence step 508. If, in a previous iteration for the same stationary state, it was sensed that the driver was present then the checking driver presence 508 is by-passed. On the other hand, if the driver presence was not previously sensed and at this iteration there still isn't a present driver another iteration of the method 500 is then reinitiated.

However, as presented in FIG. 6, once it has been established that the driver is present, identifying a stationary state period (ISSP) 509 is done through a measuring of a period step 510. As concurrently presented in FIG. 1, the measuring of a period step 510 is done by the timer 106, accordingly at this step the timer 106 is stared. If however the timer was previously started for the same detected stationary state the starting of the timer 510 is by-passed and the method 500 directly does a comparing period step 512. The comparing period step 512 verifies if the stationary state period is greater than the predetermined period threshold.

Further presented in FIG. 6 and concurrently presented in FIG. 1, according to an additional embodiment, if the stationary state period is greater than the predetermined period threshold, activating the engine cutoff (AEC) 513 is done. The controller 108 at this point activates the engine cutoff 110, basically the engine of the vehicle is turned off through a cutoff engine step 514. On the other hand, if the predetermined period threshold is not reached, another iteration of the method 500 is then reinitiated.

According to an embodiment, following the cutoff engine step 514 the driver presence flag is deactivated through a resetting driver presence step 516. In the same way, following the indicating speed step 506, when it is found that the speed of the vehicle is greater than the speed threshold the driver presence flag is deactivated through the resetting driver presence step 516. The driver presence flag must be deactivated to assure consistency in the method 500, so as the driver presence sensed during a previously detected stationary state is not confused with a future detected stationary state.

Moreover, according to another embodiment, following the cutoff engine step 514, a resetting timer step 518 is done. This is done to assure consistency in the method 500, so as the next stationary state period will be properly timed.

In addition to this, it is possible that a waiting step 520 is required in the method at each iteration for allowing a given time to pass before proceeding with another iteration of checks.

It will furthermore be apparent to a reader versed in the art that the detecting a stationary state and the sensing presence of driver are interchangeable. Moreover, it will also be apparent that the sensing presence of driver and the identifying stationary state period are interchangeable as well. In addition to this, it will be apparent that the steps herein described are interchangeable and other additional steps are insertable.

The present system and method for turning off a vehicle have been described with regard to various possible embodiments. The description as much as the drawings were intended to help the understanding of the method and apparatus for turning off a vehicle, rather than to limit their scope. Various modifications may be made to the present invention without departing from the scope of protection sought in accordance with the appended claims.

The invention claimed is:

1. A system for turning off a vehicle when in an idle state comprising:

a stationary state detector for detecting a stationary state of the vehicle;
    a timer for measuring a period during which a stationary state is detected;
    a presence sensor for sensing the presence of a driver in the vehicle;
    an engine cutoff for turning off the fuel engine; and
    a controller for processing an input from the stationary state detector, an input from the timer and an input from the presence sensor, the controller being adapted to activate the engine cutoff when the stationary state is detected for a period of time that is greater than a period threshold and when the presence sensor senses that the driver is present.

2. The system for turning off a vehicle when in an idle state of claim 1 wherein the stationary state detector is a speed reader for measuring the speed of the vehicle.

3. The system for turning off a vehicle when in an idle state of claim 2 wherein the stationary state detector detects a stationary state when the speed of the vehicle is below a speed threshold.

4. The system for turning off a vehicle when in an idle state of claim 2 wherein the speed reader is a speedometer.

5. The system for turning off a vehicle when in an idle state of claim 2 wherein the speed reader is a GPS (Global Positioning System).

6. The system for turning off a vehicle when in an idle state of claim 1 wherein the stationary state detector is a hand-brake sensor for detecting an activated hand-brake.

7. The system for turning off a vehicle when in an idle state of claim 1 wherein the presence detector is for detecting the presence of a driver by a weight sensor for a seat.

8. The system for turning off a vehicle when in an idle state of claim 1 wherein the driver presence detector is for detecting the presence of a driver by a fastened seat belt sensor.

9. The system for turning off a vehicle when in an idle state of claim 1 wherein the driver presence detector is for detecting the presence of a driver by an activated brake sensor.

10. The system for turning off a vehicle when in an idle state of claim 1 wherein the driver presence detector is for detecting the presence of a driver by an unengaged door sensor.

11. A method for turning off a vehicle when in an idle state comprising:

detecting a stationary state of the vehicle;
    sensing a presence of a driver in the vehicle;
    identifying a stationary state period; and
    activating an engine cutoff.

12. The method for turning off a vehicle when in an idle state of claim 11 wherein detecting the stationary state comprises monitoring a speed of the vehicle.

13. The method for turning off a vehicle when in an idle state of claim 12 wherein detecting the stationary state further comprises indicating the speed of the vehicle that is below a speed threshold.

14. The method for turning off a vehicle when in an idle state of claim 11 wherein identifying the stationary state period comprises measuring the stationary state period.

15. The method for turning off a vehicle when in an idle state of claim 14 wherein identifying the stationary state period further comprises comparing the stationary state period to a period threshold.

\* \* \* \* \*